United States Patent Office

3,757,011
Patented Sept. 4, 1973

3,757,011
PHENANTHROTRIAZOLYL DERIVATIVES
Fritz Fleck, Bottmingen, Basel-Land, and Horst Schmid, Munchenstein, Basel-Land, Switzerland, assignors to Sandoz Ltd. (also known as Sandoz AG), Basel, Switzerland
No Drawing. Filed Apr. 9, 1971, Ser. No. 132,868
Claims priority, application Switzerland, Apr. 17, 1970, 5,753/70
Int. Cl. C07d 55/02
U.S. Cl. 260—240.9
10 Claims

ABSTRACT OF THE DISCLOSURE

Phenanthrotriazolyl derivatives of formula

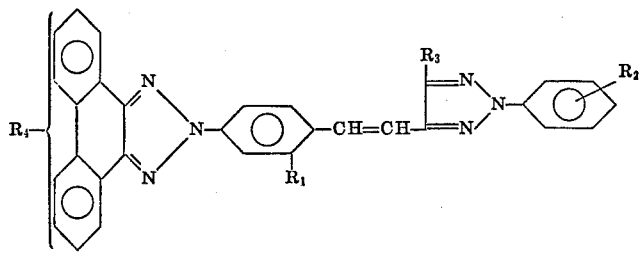

(I)

wherein
$R_1$ is H, Cl, F, CN, COOH, $SO_3H$, optionally substituted amide or ester of COOH or $SO_3H$, alkyl-$SO_2$ or aryl-$SO_2$,
$R_2$ is H, Cl, F, CN, optionally substituted alkyl or aryl, COOH, $SO_3H$, optionally substituted $SO_2$—$NH_2$,
$R_3$ is H or alkyl
and
$R_4$ is H, $SO_3H$, optionally substituted amide or ester of $SO_3H$.

This invention relates to new phenanthrotriazolyl derivatives of formula

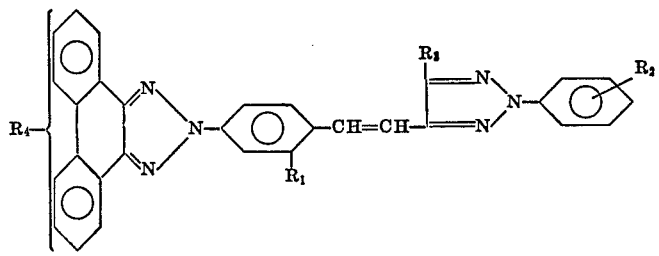

(I)

wherein
$R_1$ stands for a hydrogen, chlorine or fluorine atom, a cyano group, a carboxylic acid or sulphonic acid group, an amide or ester group of a carboxylic or sulphonic acid which may be further substituted, or an alkylsulphonyl or arylsulphonyl group,
$R_2$ for a hydrogen, fluorine or chlorine atom, a cyano group or an alkyl or aryl radical which may be substituted, a carboxylic acid or sulphonic acid group or a sulphonamide group which may be substituted,
$R_3$ for a hydrogen atom or an alkyl group
and
$R_4$ for a hydrogen atom, a sulphonic acid group or a sulphonic acid amide or ester group which may be further substituted.

The process for the production of the new compounds of Formula I comprises the oxidative cyclization of a compound of formula

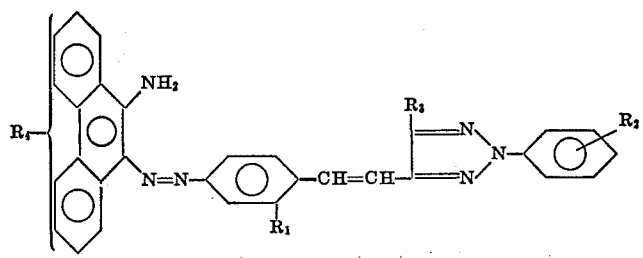

(II)

or the condensation of 1 mole of an aldehyde of formula

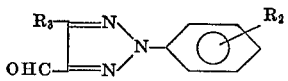

or of one of its functional derivatives, with a compound of formula

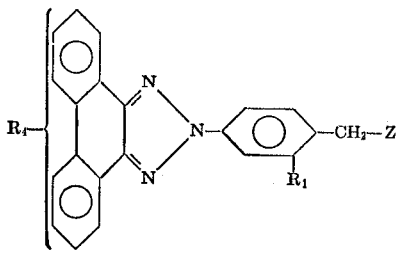

(IV)

where Z represents hydrogen, cyano, carboxy,

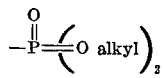

or

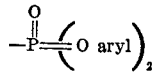

in the presence of a catalyst and at temperatures of 0° to 200° C.

If the radical $R_1$ stands for an alkylsulphonyl group it contains preferably 1 to 6 carbon atoms. If it stands for an arylsulphonyl group it is preferably mononuclear and is in particular phenyl which may be substituted by lower alkyl or alkoxy groups containing 1 to 6 carbon atoms or by halogen atoms (chlorine or fluorine). Examples of such groups are n-hexylsulphonyl, n-amyl- and iso-amyl-sulphonyl, n-butyl- and iso-butyl-sulphonyl, n-propyl- and iso-propyl-sulphonyl, in particular ethylsulphonyl and methylsulphonyl, further phenylsulphonyl, 2- and 4-methylphenyl 2- and 4-methoxy- and -ethoxyphenyl-sulphonyl, 4-chlorophenyl-, 4-fluorophenyl-, 4-ethyl-, 4-iso-propyl-, 4-n-butyl-, 4-tert.-butyl-, 4-tert.amyl-phenyl- and 4-n-butoxyphenylsulphonyl.

If the radical $R_1$ stands for a carboxylic acid or sulphonic acid ester group it may be an unsubstituted or substituted alkyl, cycloalkyl or aryl ester of one of these acids, in which case alkyl contains preferably 1 to 6 carbon atoms and cycloalkyl and aryl are preferably mono- or dinuclear. Examples of such esters are the methyl, ethyl, n-propyl, isopropyl, n-butyl, iso-butyl, tert.butyl, n-amyl, iso-amyl, n-hexyl, β-methoxyethyl, β-ethoxyethyl, β-n-butoxyethyl, γ-methoxypropyl, δ-methoxybutyl, β-(β'-methoxyethoxy)-ethyl, β-(β'-ethoxyethoxy)-ethyl, β-(β'-n-butoxyethoxy)-ethyl, β-hydroxyethyl, β- and γ-hydroxypropyl, β-chlorethyl, β,β-difluorethyl, benzyl, β-phenylethyl, β-phenoxyethyl, cyclohexyl, 4-methyl-cyclohexyl, phenyl, 2-, 3- and 4-methylphenyl, 2- and 4-methoxyphenyl, 2- and 4-ethoxyphenyl, 2-, 3- and 4-chlorophenyl, 4-fluorophenyl, 4-ethylphenyl, 4-iso-propylphenyl, 4-n-butylphenyl, 4-tert.butylphenyl, 4-tert.amylphenyl, 2,4- and 2,5-dimethylphenyl, 2,4- and 2,5-dichlorophenyl, naphthyl-1, naphthyl-2 and 4-diphenylyl esters of carboxylic and sulphonic acids.

If $R_1$ has the meaning of an optionally substituted carboxylic acid or sulphonic acid amide group it may be, for example, an alkyl, cycloalkyl or arylamide group of such an acid, in which case alkyl contains preferably 1 to 6 carbon atoms and cycloalkyl and aryl and preferably mono- or dinuclear. Examples of such amides are carboxylic acid and sulphonic acid methyl-, ethyl-, n-butyl-, n-amyl-, n-hexyl-, dimethyl-, diethyl-, β-hydroxyethyl-, β- and γ-hydroxypropyl-, di-(β-hydroxyethyl)-, di(β- and -(δ-hydroxypropyl)-, β-methoxyethyl-, β-ethoxyethyl-, δ-methoxypropyl-, benzyl-, β-phenylethyl-, β-phenoxyethyl-, cyclohexyl-, 4-methylcyclohexyl-, phenyl-, 2-, 3- and 4-methylphenyl-, 2- and 4-methoxyphenyl- and -ethoxyphenyl-, 2-, 3- and 4-chlorophenyl-, 4-fluorophenyl-, 4-ethylphenyl-, 4-iso-propylphenyl-, 4-n-butylphenyl-, 4-tert.butylphenyl-, 4-tert.amylphenyl-, 2,4- and 2,5-dimethylphenyl-, 2,4- and 2,5-dichlorophenyl-, N-methyl-N-phenyl-, N-ethyl-N-phenyl-, N-β-hydroxyethyl-N-phenyl-, naphthyl-1-, naphthyl-2- and -4-diphenylylamide.

If $R_2$ stands for an alkyl radical it contains preferably 1 to 6 carbon atoms and may bear substituents such as hydroxyl, cyano, lower alkoxy groups or halogen atoms. For example, it can be methyl, ethyl, iso-or n-propyl, n-butyl, iso-butyl, tert.butyl, n-amyl, tert.amyl, n-hexyl, 2-methoxyethyl, 2-ethoxyethyl, hydroxyethyl, cyanethyl, trifluoromethyl, 2,2-difluorethyl.

The radical $R_3$, if an alkyl group, contains preferably 1 to 3 carbon atoms and may be, e.g. methyl, ethyl, iso-propyl or n-propyl.

The radical $R_4$ if it stands for a sulphonic acid ester or amide group which may be further substituted, may have any of the meanings given for $R_1$ in the sense of a sulphonic acid ester or amide group.

Oxidative cyclization of the compound of Formula II can be conveniently carried out in the presence of an organic solvent which is stable to oxidation. Examples of such solvents are hydrocarbons which may be halogenated or nitrated, such as benzene, toluene, chlorobenzene, ortho-dichlorobenzene, bromobenzene, nitrobenzene, 1,2 - dichloroethane, 1,1,2,2-tetrachlorethane; amides such as dimethyl formamide, dimethyl acetamide, phosphoric acid tris-(dimethylamide); sulphones such as tetramethylene sulphone; ethers such as methoxy- and ethoxybenzene, dioxan, 1,2-dimethoxy- and 1,2-diethoxyethane; tertiary amines such as dimethylamino- and diethylaminobenzene, triethylamine, tri-(n-butyl)-amine, pyridine, picoline, quinoline and mixtures of pyridine bases.

The suitable oxidizing agents include alkali hypohalogenites, preferably sodium hypochlorite or sodium hypobromite, inorganic and organic copper (II) compounds such as copper (II) chloride, sulphate, acetate, carbonate and naphthenate. The copper (II) compounds are employed preferably in the presence of nitrogen bases such as ammonia, amines such as trimethylamine, ethanolamine, diethanolamine, triethanolamine, pyridine. Further oxidizing agents are air or oxygen, in the presence of catalytic amounts of a copper (II) compound.

The suitable temperature range for oxidative cyclization is 0° to 150° C. In the case of the alkali hypohalogenites it is preferably room temperature to 40° C. If a copper compound is used alone or with oxygen or air in the presence of maximum 10%, preferably about 3–6%, of the stoichiometric amount of a copper (II) compound the temperature range is 90° to 130° C.

The starting compounds of Formula II can be produced by coupling diazo compounds of amines of formula

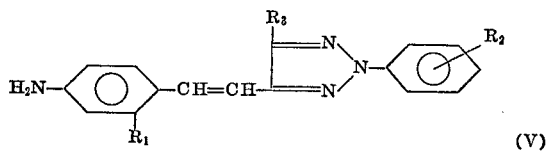

(V)

with a compound of formula

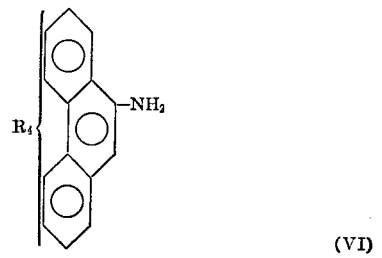

(VI)

at pH 3 to 8, preferably pH 5-6, in the temperature range of 0° to 60° C. The coupling reaction is commenced at about 5-15° C. and completed at about 50-60° C. in an aqueous or aqueous-organic medium such as a mixture of water and pyridine or pyridine bases or in a urea solution.

The reaction of the aldehyde of Formula III or one of its functional derivatives such as the oxime, hydrazone or anile with a compound of Formula IV is carried out at 0° C. to 200° C., preferably 20° C. to 160° C., in the presence of a catalyst such as boric acid, zinc chloride, arylsulphonic acids, alkali salts or alkaline-earth salts of arylsulphonamides, acetic anhydride, alkali acetates, piperidine, alkali or alkaline-earth hydroxides, alkali or alkaline-earth alcoholates. If Z represents hydrogen it is of advantage for the progress of the reaction for the vicinal benzene nucleus to bear a negative substituents such as —CN, —COOH, —$SO_3H$ or a substituted or unsubstituted ester of amide group of a carboxylic or sulphonic acid.

On completion of the reaction the Group Z, if present, is removed by an appropriate method. The reaction can be accomplished by melting the reactants, but it is best to work with an inert solvent, for example in aliphatic or aromatic, preferably halogenated hydrocarbons, alcohols, ethers, glycols, amides such as formamide, dimethyl formamide, dimethyl acetamide, N-methylpyrrolidone, phosphoric acid tris-(dimethylamide), acetonitrile, dimethylsulphoxide or tetramethylene sulphone.

The compounds of Formula I can be isolated by standard methods, e.g. filtration with suction if they are present in suspension, precipitation with a suitable agent and filtration with suction, evaporation or steam distillation of the solvent and suction filtration of the precipitated product.

Interesting phenanthrotriazolyl derivatives of Formula I are those of formula

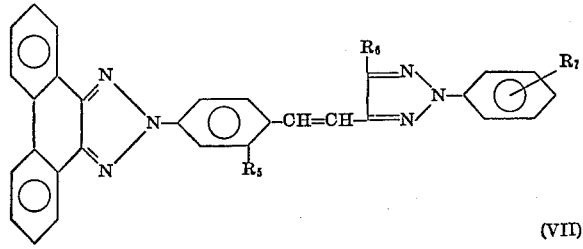

(VII)

wherein $R_5$ stands for hydrogen, cyano, —CO—$NH_2$, a carboxylic acid alkyl, cyclohexyl or benzylester group, a sulphonic acid or sulphonic acid alkylester group, an optionally substituted sulphonic acid phenylester group or a sulphonamide group which may be mono- or disubstituted, $R_6$ for hydrogen or methyl, $R_7$ for hydrogen, chlorine, methyl, cyano, a sulphonic acid or sulphonic acid amide group in meta- or para-position and alkyl contains 1 to 6 carbon atoms.

Especially interesting products of Formula VII are those in which $R_5$ represents hydrogen, cyano, a sulphonic acid or sulphonic acid phenylester group, $R_6$ hydrogen and $R_7$ hydrogen, methyl or cyano in para-position.

The water insoluble phenanthrotriazolyl derivatives can be converted into water soluble compounds by treatment with sulphonating agents, e.g. concentrated sulphuric acid of 90–100% strength, weak oleum with an $SO_3$ content of up to about 30%, chlorosulphonic acid or gaseous $SO_3$, at temperatures of 0° to about 100° C., preferably at 20° C. to 50–60° C. Treatment is continued until the necessary number of sulphonic acid groups, e.g. 1 to 3, has been introduced, or until the product is soluble in water. If chlorosulphonic acid or gaseous $SO_3$ is chosen it is advisable to carry out sulphonation in an inert solvent such as sulphuric acid, ortho-dichlorobenzene or nitrobenzene, whereas if concentrated sulphuric acid or oleum is used the sulphonating agent itself acts as solvent. The sulphonic acid group or groups enter preferentially into the phenanthrene radical or the right-hand benzene radical.

The new phenanthrotriazolyl compounds of Formula I have excellent properties for the optical brightening of organic materials and plastics of the most varied nature. By "organic materials" are understood natural fibres such as cotton, and wool and in addition fibre-forming polymers such as polyesters, polyamides, polyurethanes, polyolefins (polyethylene, polypropylene), polyvinyl acetate, polyvinyl chloride, polyvinylidene chloride, polyacrylonitrile, modified polyacrylonitrile, cellulose-2½-acetate, cellulose triacetate and polystyrene.

The phenanthrotriazolyl compounds are applicable by the normal methods, either as solutions in water or organic solvents or as aqueous dispersions. They give particularly good results when incorporated in spinning melts or solutions and in moulding compositions, and when added in the production of the polymer, either to the monomers or to the prepolymer.

Depending on the method of application the compounds are employed in amounts of 0.001–0.5% or more especially 0.01–0.2% on the weight of the material to be brightened. They are applicable alone and in combination with other brighteners, and in the presence of chemical bleaching agents and surface-active agents such as detergents and carriers.

If polyester fabrics are to be optically brightened it is of advantage to apply the selected phenanthrotriazolyl derivative by a padding process from an aqueous medium containing a surface-active agent and to treat the padded fabric in dry heat, preferably at 150–240° C., as in the thermosol process.

The brighteners of this invention have a high saturation limit and give effects distinguished by a neutral blue-violet to blue fluorescence colour which are very fast to light. In comparison with the naphthotriazolyl compounds of Belgian Pat. No. 722, 920, the phenanthrotriazolyl compounds produced as disclosed herein are more highly effective brighteners, i.e. they show more intense fluorescence and hence brightness, have a natural fluorescence colour (the absorption maximum is located at about $\lambda=375$ nm., the emission at about $\lambda=428$ nm.) and lower volatility which means higher fastness to sublimation.

In the following examples the parts and percentages are by weight and the temperatures in degree centigrade.

EXAMPLE 1

Seven parts of 4 - amino-2-cyano-$\beta$-(2'-phenyl-oso-triazolyl) - styrene and 40 parts of 2 - ethoxyethanol are thoroughly mixed, with cooling to 5°. Then 10 parts of concentrated hydrochloric acid, 30 parts of water and 20 parts of ice are added consecutively to the mixture. It is diazotized with a solution of 3 parts of sodium nitrite in 20 parts of water at a controlled temperature of 0–5°. After continued stirring for 2 hours at 5–8° the excess nitrous acid is decomposed with urea or sulphamic acid.

A dispersion of 5 parts of finely pulverized 9-aminophenanthrene hydrochloride in 10 parts of pyridine and 40 parts of 2 N sodium hydroxide solution is prepared separately and added to the diazo suspension at 5–10° in the course of 10 minutes (pH 5–6). The temperature is increased to 50–60° and this temperature maintained for 1 hour. On cooling the resulting compound settles out. It is filtered with suction, washed with water till neutral and dried.

The 12 parts of the red azo compound thus obtained are mixed with 18 parts of crystallized copper acetate and 80 parts of pyridine. The mixture is reacted for 4 hours at 100° with constant stirring. After cooling the phenanthrotriazolyl compound formed is filtered, washed with water till the wash water is colourless, and dried. On recrystallization from 70 parts of chlorobenzene it is obtained as needle-shaped crystals of lemon colour with melting point 279–280°. This compound has the formula

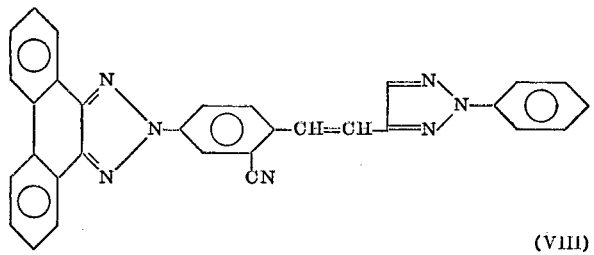

(VIII)

Its absorption maximum is at λ=375 nm. and the fluorescence emission at 428 nm.

Applied to polyester fibres by the thermosol process, this brightener produces effects of greater intensity and brilliance and of a more neutral white than those given by the nearest comparable naphthotriazolylstyrene derivatives, which are disclosed in the published German patent application No. 1,805,371.

Further brighteners of Formula I conforming to the present invention are set out in the following table. They are distinguished by the meanings of the symbols $R_1$ to $R_4$ and by the fluorescence colour in chlorobenzene or (in the case of the water soluble compounds) in a water-alcohol mixture.

TABLE

| Example No. | $R_1$ | $R_2$ | $R_3$ | $R_4$ | Fluorescence colour |
|---|---|---|---|---|---|
| 2 | $-SO_3-\langle\bigcirc\rangle$ | H | H | H | Violet. |
| 3 | H | H | H | H | Do. |
| 4 | $-SO_3Na$ | H | H | H | Blue violet. |
| 5 | $-SO_3Na$ | Meta Cl | H | H | Violet. |
| 6 | $-SO_3Na$ | Para $CH_3$ | H | H | Do. |
| 7 | $-SO_2-NH_2$ | H | H | H | Do. |
| 8 | $-CN$ | Para $CH_3$ | H | H | Red violet. |
| 9 | $-CN$ | Para Cl | H | H | Do. |
| 10 | $-CN$ | Meta Cl | H | H | Do. |
| 11 | H | Para CN | H | H | Blue violet. |
| 12 | $-CO-NH_2$ | H | H | H | Red violet. |
| 13 | $-COOCH_3$ | H | H | H | Do. |
| 14 | $-COOC_4H_9n$ | H | H | H | Do. |
| 15 | $-SO_2-NH-CH_3$ | H | H | H | Violet. |
| 16 | $-SO_2-NH-C_2H_5$ | H | H | H | Do. |
| 17 | $-SO_2-N(CH_3)_2$ | H | H | H | Do. |
| 18 | $-SO_2-NH-\langle\bigcirc\rangle$ | H | H | H | Do. |
| 19 | $-SO_2-N(C_2H_5)_2$ | H | H | H | Do. |
| 20 | $-SO_2-NH-C_4H_9n$ | H | H | H | Do. |
| 21 | $-SO_2-NH-\langle\bigcirc\rangle-CH_3$ | H | H | H | Do. |
| 22 | $-SO_2-NH-C_6H_{13}n$ | H | H | H | Do. |
| 23 | $-SO_2-NH-\langle\bigcirc\rangle$ H | H | H | H | Do. |
| 24 | $-SO_2-NH-C_2H_4-OC_2H_5$ | H | H | H | Do. |
| 25 | $-SO_2-NH-\langle\bigcirc\rangle-OCH_3$ | H | H | H | Do. |
| 26 | $-SO_2-NH-\langle\bigcirc\rangle Cl$ | H | H | H | Do. |
| 27 | $-SO_2-NH-CH_2-\langle\bigcirc\rangle$ | H | H | H | Do. |
| 28 | $-SO_2-O-CH_3$ | H | H | H | Do. |
| 29 | $-SO_2-O-C_4H_9n$ | H | H | H | Do. |
| 30 | $-SO_2-O-C_6H_{13}n$ | H | H | H | Do. |
| 31 | $-SO_2-O-\langle\bigcirc\rangle-CH_3$ | H | H | H | Do. |
| 32 | $-SO_2-O-\langle\bigcirc\rangle-Cl$ | H | H | H | Do. |
| 33 | H | Para $SO_2Na$ | H | H | Blue violet. |
| 34 | H | Para $SO_2NH_2$ | H | H | Do. |
| 35 | $-CN$ | Para $CH_3$ | H | H | Violet. |
| 36 | $-CN$ | H | $CH_3$ | H | Do. |
| 37 | $-CN$ | Para $CH_3$ | $CH_3$ | H | Do. |
| 38 | $-CO-NH_2$ | H | $CH_3$ | H | Red violet. |
| 39 | $-SO_3Na$ | H | $CH_3$ | H | Blue violet. |
| 40 | $-SO_3Na$ | Para $CH_3$ | $CH_3$ | H | Do. |
| 41 | $-SO_3Na$ | Para $CH_3$ | $CH_3$ | H | Do. |
| 42 | H | Para $SO_2NH_2$ | $CH_3$ | H | Do. |
| 43 | $-COO-CH_2-\langle\bigcirc\rangle$ | H | H | H | Red violet. |
| 44 | $-COO-\langle\bigcirc\rangle$ H | H | H | H | Do. |

The compound of Example 2 melts at 227–229° and its fluorescence emission is at 428 nm. The compound of Example 3 melts at 264–266° and its fluorescence emission is at 422 nm. The compound of Example 4 has its absorption maximum at λ=367 nm. in aqueous-alcoholic medium.

EXAMPLE 45

At 10–20° 10 parts of the brightener produced as in Example 1 are entered into 40 parts of 100% sulphuric acid, with stirring until everything is dissolved. 10 parts of 25% oleum are dropped in at 15–20°, then stirring is continued for a few hours at 30–40° until a sample is found to be fully soluble in water. The sulphonation mixture is run into a mixture of 100 parts of ice and 100 parts of water and the precipitate is isolated by filtration and entered into 100 parts of water. After neutralization with sodium hydroxide solution, the product is salted out with sodium chloride, filtered, washed with sodium chloride solution if necessary, and dried. The new brightener is obtained in the form of a yellow powder which dissolves in water with blue fluorescence.

Application Example A 10 parts of the compound of Formula VIII are mixed with 22 parts of a highly sulphonated castor oil, 8 parts of sodium dioctylphenylpolyglycoletheroxyacetate containing 40 ethenoxy groups in the molecule, and 80 parts of water. The mixture is comminuted in a suitable machine such as a sand mill until the bulk of the particles are 0.5–2 microns in size.

A bath is prepared with 3000 parts of water, 15 parts of a carried based on ortho-dichlorobenzene and 2 parts of the aforedescribed dispersion. At 50° 100 parts of a fabric of polyester (polyethylene terephthalate) fibre are entered into the bath, which is brought to the boil in 45 minutes and held for 45 minutes at this temperature. The fabric is then conveyed into a second bath containing 1.5 g./l. octylphenyl decaglycol ether and treated for 10 minutes at 70° and at liquor ratio 40:1. On removal it is rinsed with warm water and dried. The treated polyester fabric exhibits a notably high degree of whiteness. If an enclosed machine operated at 120–130° is used, comparable white effects are obtainable without the addition of a carrier.

Application Example B

A batch of polyamide 6 (poly-ε-caprolactam) granules is powdered in a mixer with 0.01–0.05% of its weight of the compound of Example 3. It is then charged into a melt spinning machine, where the granules are melted under nitrogen for 30 minutes at about 300°, stirred for 15 minutes at this temperature and then raised to the spinning temperature, 285°. At 3–5 atmospheres excess pressure (nitrogen) the melt is spun as filament. In daylight the filament shows violet fluorescence. It appears much whiter and brighter than comparable filament spun without brightener.

Polyester or polypropylene can be employed in place of polyamide, the spinning temperature than being 290° or 260° respectively; the resulting filaments show a higher degree of white than comparable filament produced without brightener.

Application Example C

In a mixer 100 parts of polypropylene granules are powdered with 0.01 part of the compound of Example 3. The polypropylene is processed on a roller mill at 144–220°. Subsequently it is either injection moulded as panels or regranulated and moulded in the desired form. The moulded articles thus produced show an appreciably higher degree of whiteness than in the absence of the brightener. The polypropylene can be replaced by another polyolefin, low-density or high-density polyethylene, polystyrene or cellulose acetate.

Application Example D

A solution of 0.005 part of the compound of Example 2 in a plasticizer is stirred into 100 parts of a moulding composition consisting of 65 parts of polyvinyl chloride, 35 parts of a plasticizer such as dioctyl phthalate and 2%, on the weight of the polymer, of a stabilizer. After treatment on a roller mill for 10 minutes at 150–160° the mass is drawn off as film. If opaque film is desired 2.5% titanium dioxide is added prior to processing. The films are of superior appearance to comparable films produced without brightener.

Application Example E

A batch of 100 parts of polyester (polyterephthalic ethylene-glycol ester) granules is intimately mixed with 0.01 part of the compound of Example 1, melted at 280–300° and extruded as filament through a standard spinneret. The brightened polyester filament exhibits an intense reddish voilet effect which is very fast to light.

The compound of Example 2 can be added to the starting materials before or during condensation polymerization to the polyester.

Formulae of representative phenanthrotriazolyl derivatives of the foregoing examples are as follows:

EXAMPLE 2

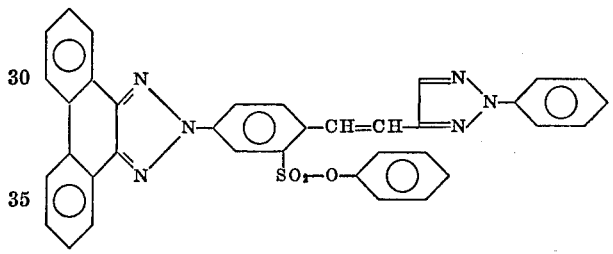

EXAMPLE 4

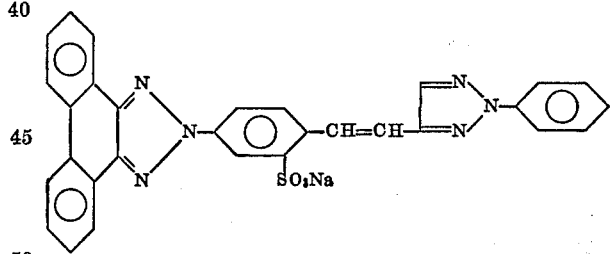

EXAMPLE 8

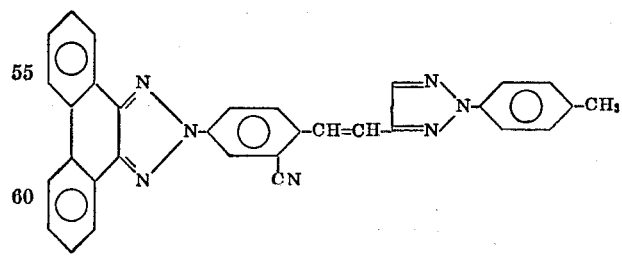

EXAMPLE 11

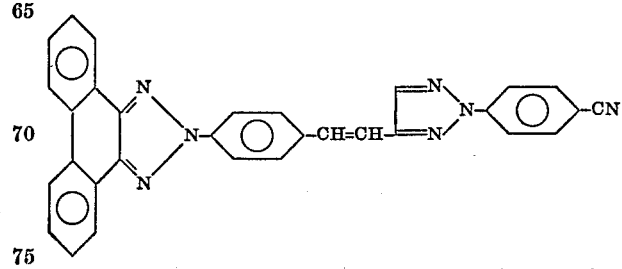

Having thus disclosed the invention what we claim is:
1. A compound of the formula

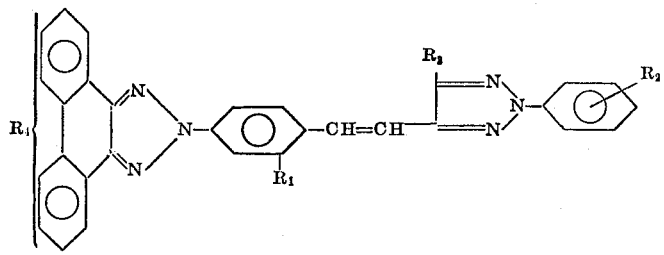

wherein $R_1$ is hydrogen; chloro; fluoro; cyano; a carboxylic or sulfonic acid group; an alkyl, cycloalkyl or aryl ester of carboxylic or sulfonic acid; carboxylic acid amide; sulfonic acid amide; an N-substituted or N,N-disubstituted carboxylic or sulfonic acid amide; alkylsulfonyl of 1 to 6 carbon atoms; or phenyl sulfonyl which may be substituted by lower alkyl, lower alkoxy or halo;

$R_2$ is hydrogen; fluoro; chloro; cyano, substituted or unsubstituted alkyl of 1 to 6 carbon atoms in which the substituents are hydroxyl, cyano, lower alkoxy, or halogen; aryl; a carboxylic or sulfonic acid group; or substituted or unsubstituted sulfonic acid amide, $R_3$ is hydrogen or alkyl, and $R_4$ is hydrogen, a sulfonic acid group; or a substituted or unsubstituted sulfonic acid amide or ester provided that any aryl groups are phenyl or naphthyl and that the substituents on the substituted carboxylic and sulfonic acid amides are, independently, alkyl, cycloalkyl or aryl and, with respect to these substituents and the alkyl, cycloalkyl and aryl portions of the carboxylic and sulfonic acid esters, the alkyl groups contain 1 to 6 carbon atoms, and the alkyl, cycloalkyl and aryl groups are unsubstituted or substituted by lower alkyl, lower alkoxy, chloro, fluoro, phenyl, phenoxy, lower alkoxy (lower) alkoxy, or hydroxy.

2. A compound according to claim 1 wherein $R_2$ is hydrogen, fluoro; chloro; cyano; substituted or unsubstituted alkyl of 1 to 6 carbon atoms in which the substituents are hydroxyl, cyano, lower alkoxy, or halogen; a carboxylic or sulfonic acid group; or sulfonic acid amide, and $R_3$ is hydrogen or alkyl of 1 to 3 carbon atoms.

3. A compound according to claim 2 wherein $R_1$ stands for hydrogen, cyano, —CO—NH$_2$, a carboxylic acid alkyl, cyclohexyl or benzylester group, a sulfonic acid group, a sulfonic acid alkylester group, a substituted or unsubstituted sulfonic acid phenylester group, or a substituted or unsubstituted sulfonamide group, $R_2$ for hydrogen, chlorine, methyl, cyano, a sulfonic acid group or sulfonic acid amide group in meta- or para-position, $R_3$ for hydrogen or methyl, $R_4$ is hydrogen, and alkyl contains 1 to 6 carbon atoms.

4. A compound according to claim 2 wherein $R_1$ is hydrogen; fluoro; chloro; cyano; a carboxylic or sulfonic acid group; a carboxylic or sulfonic acid amide group; an N-substituted or N,N-disubstituted carboxylic acid or sulfonic acid amide in which the substituents are, independently, alkyl of 1 to 6 carbon atoms which may be substituted with hydroxy, lower alkoxy, phenyl, or phenoxy, cyclohexyl which may be substituted by lower alkyl, phenyl which may be substituted by lower alkyl, lower alkoxy, fluoro, chloro or phenyl or naphthyl; a carboxylic or sulfonic acid alkyl, cyclohexyl, phenyl or naphthyl ester of which the alkyl group contains 1 to 6 carbon atoms and may be substituted by lower alkyl, phenyl which may be substituted by lower chloro, fluoro, phenyl or phenoxy, the cyclohexyl group may be substituted by lower alkyl, and the phenyl group may be substituted by lower alkyl, lower alkoxy, chloro, fluoro or phenyl; alkylsulfonyl of 1 to 6 carbon atoms or phenylsulfonyl which may be substituted by lower alkyl, lower alkoxy, chloro, or fluoro, and $R_4$ is hydrogen; a sulfonic acid group; or a sulfonic acid ester or amide which is unsubstituted or substituted as specified for $R_1$.

5. A compound according to claim 3 in which $R_1$ is hydrogen, cyano, sulfonic acid or salt thereof of sulfonic acid phenylester, $R_2$ is hydrogen or methyl or cyano in the para-position, and $R_3$ is hydrogen.

6. The phenanthrotriazolyl derivative according to claim 1 of formula

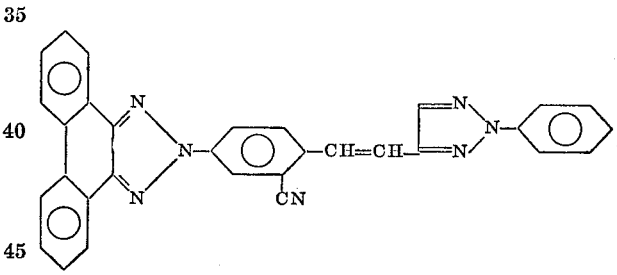

7. The phenanthrotriazolyl derivative according to claim 1 of formula

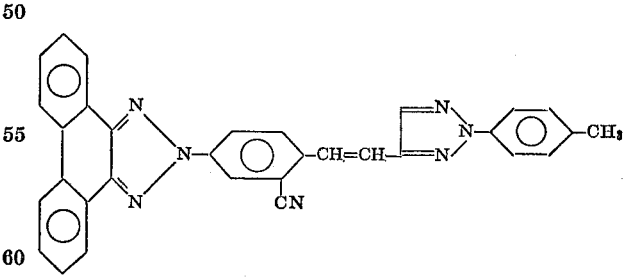

8. The phenanthrotriazolyl derivative according to claim 1 of formula

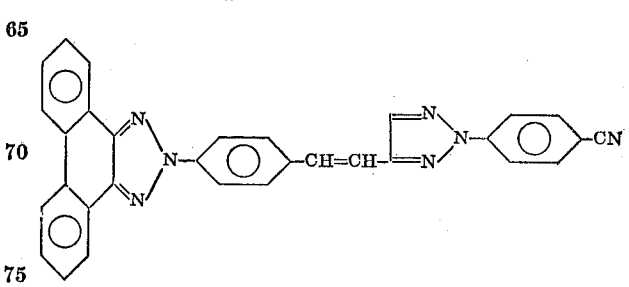

9. The phenanthrotriazolyl derivative according to claim 1 of formula
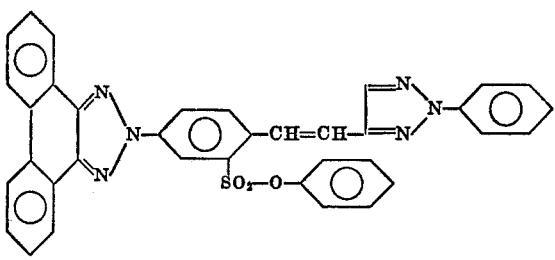
10. The phenanthrotriazolyl derivative according to claim 1 of the formula
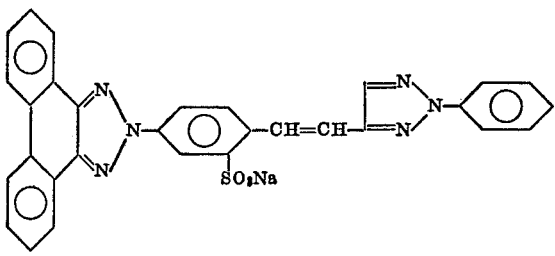
References Cited
UNITED STATES PATENTS
| 3,449,333 | 6/1969 | Dorlars et al. | 260—240 C |
| 3,637,673 | 1/1972 | Okubo et al. | 260—240.9 |
FOREIGN PATENTS
| 8,884 | 4/1969 | Japan | 260—240 D |
JOHN D. RANDOLPH, Primary Examiner
U.S. Cl. X.R.
117—33.5 T; 252—301.2 W, 543; 260—41 B, 75 N, 78 S, 92.8 R, 93.7, 157, 308 B